Patented Apr. 22, 1924.

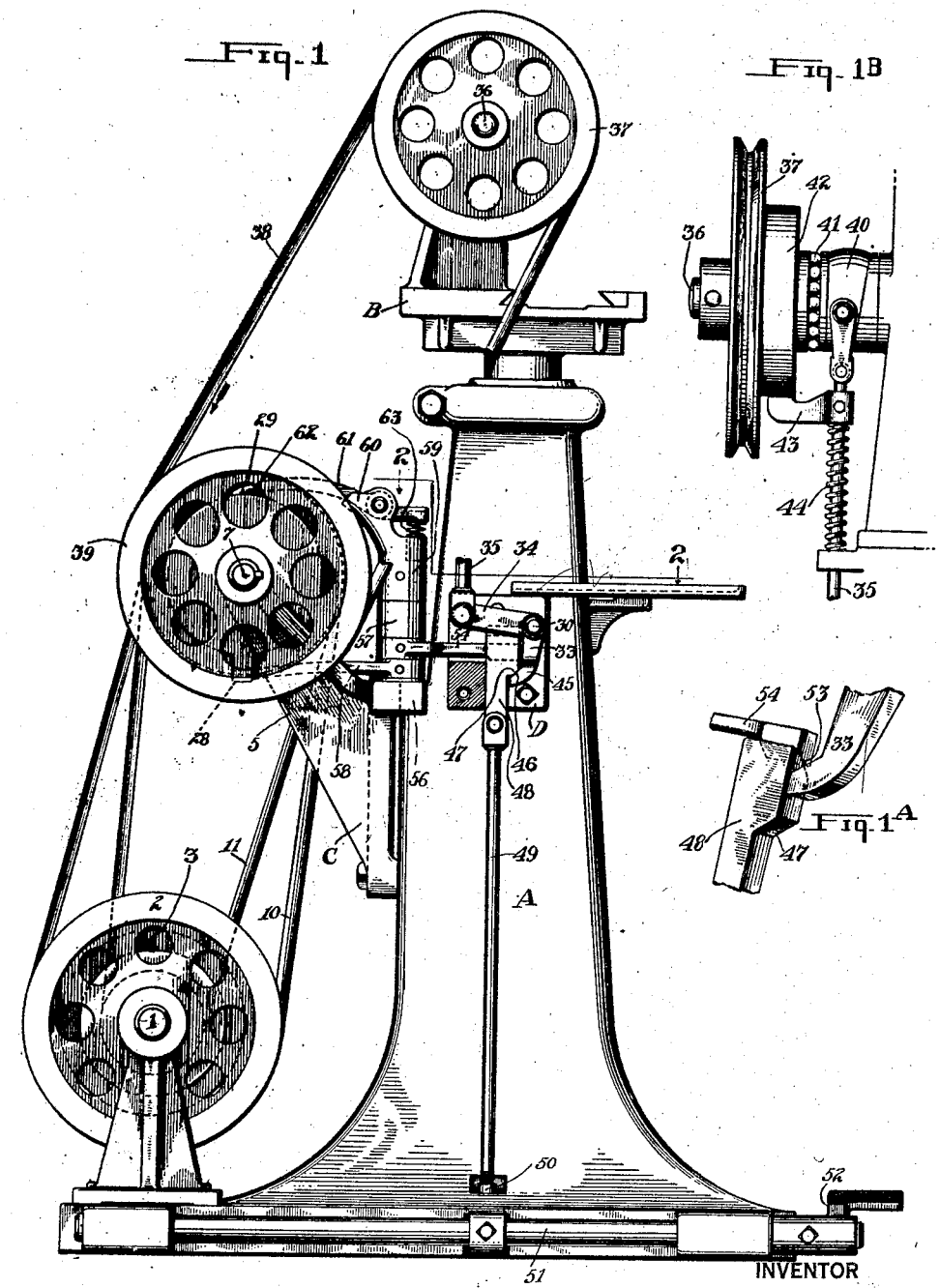

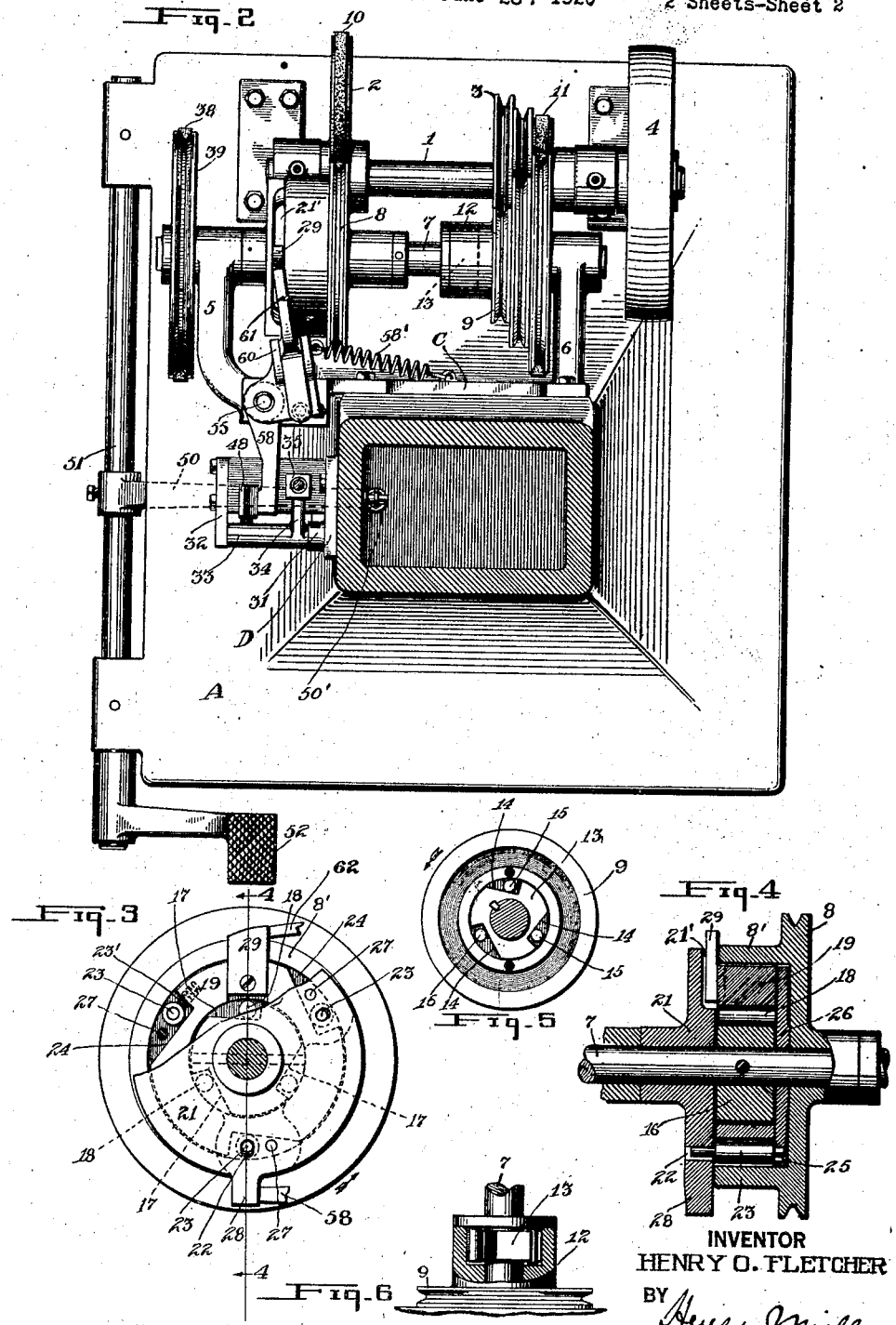

1,491,006

UNITED STATES PATENT OFFICE.

HENRY O. FLETCHER, OF STRATFORD, CONNECTICUT, ASSIGNOR TO THE SINGER MANUFACTURING COMPANY, A CORPORATION OF NEW JERSEY.

DRIVE MECHANISM.

Application filed June 28, 1920. Serial No. 392,162.

*To all whom it may concern:*

Be it known that I, HENRY O. FLETCHER, a citizen of the United States, residing at Stratford, in the county of Fairfield and State of Connecticut, have invented certain new and useful Improvements in Drive Mechanism, of which the following is a specification, reference being had therein to the accompanying drawings.

This invention relates to variable speed drive mechanism and while particularly designed for application to shoe sewing machines, is not limited thereto.

It has been found desirable in machines of this character, to provide for operation at definite high and low speeds, so that the operator may be able to manipulate the work readily in proper time therewith, such manipulation evidently being difficult should these speeds be variable and uncertain.

This invention provides simple mechanism by which this desirable result may be attained, a single high speed being provided while the lower speed may be selected from a plurality of possible speeds. It also provides means for starting the machine at the lower speed at which it may be maintained as long as desired, and then by further motion of the starting element, preferably a treadle, the speed may be increased to the higher value, the machine passing through the lower speed again before it may be stopped.

For a more complete understanding of this invention with these and other objects, and advantageous details and combinations of parts, reference may be had to the accompanying drawings, illustrating one embodiment thereof in which, Fig. 1 is a side elevation with parts removed illustrating the invention as applied to a shoe sewing machine.

Figs. 1^A and 1^B, are details of the same mechanism.

Fig. 2, is a cross section on line 2—2 of Fig. 1.

Fig. 3, is an end view with parts removed of a portion of the high speed drive mechanism.

Fig. 4, is a section on the line 4—4 of Fig. 3.

Fig. 5, is an end view with cover plate removed of the low speed over-running clutch, and, Fig. 6, is a partial cross section thereof.

In these figures A represents a machine pedestal carrying the head B for supporting the working instrumentalities. Carried by bearings at the rear of the machine base A, is a drive shaft 1 having fixed thereon a pulley 2, and a stepped pulley 3. At one extremity shaft 1 carries a main driving pulley 4 for connection to a suitable source of power. A bracket C made fast to the pedestal A above its base carries spaced bearings 5 and 6, in which is journaled a countershaft 7. Shaft 7 has journaled thereon a pulley 8 in alignment with pulley 2 of shaft 1, and also a stepped pulley 9 in alignment with pulley 3. Belts 10 and 11 connect respectively the pulleys 2 and 8, and 3 and 9, by which means pulleys 8 and 9 are constantly driven during the rotation of shaft 1, pulley 8 being driven always at the higher speed. Pulley 9, as shown in Figs. 5 and 6, is provided with a hollow hub 12, for the reception of an over-running clutch, this comprising a sleeve or collar 13 fixed to the shaft 7 and having inclined roller-ways 14 for the reception of clutch rollers 15 movable by relative rotation of shaft 7 and hub 12 in one direction into clutching engagement with the inner face or hub 12, and on relative rotation of these members in the opposite direction out of clutching engagement.

As shown in Fig. 4, pulley 8 has a laterally extending flange 8', forming a housing for the reception of clutching elements, these elements comprising a sleeve or collar 16 fixed to shaft 7 of similar construction to the collar 13, having inclined camways 17 for the reception of clutch rollers 18, these clutch rollers being arranged to move into clutching engagement with the inner surface of an idler element in the form of a sleeve or collar 19 on relative rotation of collars 16 and 19 in one direction, and to be freed from clutching engagement on relative rotation of these members in the opposite direction, forming an over-running clutch of the same type as provided for pulley 9. Both over-running clutches allow shaft 7 to be rotated freely in normal direction at a more rapid rate than the clutch carrying members but will not allow slower or reverse rotation. Adjacent the collar 16 a disc 21 is journaled on shaft 7, this disc being provided with slots 22, for the reception of reduced extremities of rollers 23 riding on wedge cam surfaces 24 in the outer face of the collar 19. The other ends of rollers 23 are mounted in similar slots as shown at 25 in a disc 26 also journaled on the shaft 7. The discs 21 and 26 are connected for simultaneous rotation to form a cage for rollers 23, by means of pins 27 passing therebetween within the depression of the collar 19 formed by the cam portions 24. Springs 23' normally urge rollers 23 relative to the cam surfaces 24 to bring the rollers into clutching engagement with the inner face of flange 8'. Projecting radially from the periphery of disc 21 is a stop lug 28. The inner face of disc 21 is recessed between the slots 22 and through the recess 21' diametrically opposite lug 28 a lug 29 made fast in a slot in the end face of collar 19 projects beyond the flange 8' but to a shorter distance than lug 28.

Mounted adjacent the bracket C on the pedestal A is a bracket D. A pivot pin 30 is fastened between a boss 31 on the bracket D and a plate 32 made fast to the end of this bracket remote from the standard A, on which pin is journaled a bell crank lever 33, the horizontal arm 34 of which carries pivoted at its outer end a rod 35. As shown in Fig. 1ᴮ, rod 35 extends upwardly to the machine head for actuation of a suitable stop mechanism for the mechanism actuating shaft 36, a pulley 37 journaled thereon being connected by a belt 38 to a pulley 39 fixed to one end of shaft 7. This stop mechanism may be of any suitable description, its specific form being immaterial to this invention. As herein shown, however, a wedge clutch comprising the wedge collar 40 through which the shaft 36 passes is arranged by downward movement of the rod 35, and through the ball bearing 41, to move the brake pulley 42, splined to shaft 36, into driving engagement with the pulley 37. On upward movement of the rod 35, a brake arm 43 carried thereby engages the outer surface of the wheel 42 to stop the machine, the parts being normally held in unclutched and stopped position by means of the spring 44. The other arm 45 of the bell crank lever 33 extends downwardly, and is formed at its lower end with a cam surface 46, arranged to be engaged by a mating surface 47 of a block 48, mounted for vertical sliding motion on the bracket D and being actuated by a rod 49 pivoted thereto. At its lower end rod 49 is attached to an arm 50 made fast to a rock shaft 51 to which a treadle 52 is fixed at the forward face of the machine, the treadle being normally held upwardly by a spring 50' engaging the arm 50 within the pedestal A. Block 48, as shown in Fig. 1ᴬ has a second cam surface 53 for engagement with a mating surface on an arm 54 made fast to a vertically extending shaft 55 journaled in bearings 56 and 57 carried by the bracket C. An arm 58, also fixed to the shaft 55, projects toward the shaft 7 in position to engage at suitable times the stop lug 28 carried by the disc 21 above mentioned, though at such a distance from shaft 7 to allow the shorter lug 29 of collar 19 to clear the same on rotation thereof. Above the bearing 57, shaft 55 has fixed thereto to a collar 59 having a laterally extending bifurcated portion 60 between the forks of which is pivoted a lever 61 whose rear end 62 is normally pressed downwardly by means of a spring 63 seated in a socket in the upper face of collar 59, and bearing against the forward end of lever 61 in a socket therein. End 62 of this lever may swing at suitable times into the path of the stop lugs 28 and 29, the spring 63 allowing it to yield to normal rotation of disc 21, but springing it into position after the passage of each lug to prevent reverse rotation thereof. A spring 58' fast to arm 58 and to bracket C tends to swing members 58 and 62 out of the plane of rotation of disc 21.

The operation of this mechanism is as follows, the treadle being in its raised position the mechanism actuating shaft 36 is stopped, the brake arm 43 engaging the brake wheel 42, the clutch being in unclutched position. Rotation being imparted to the shaft 1 by means of the belt pulley 4, pulleys 2 and 3 are both rotated imparting a relatively high speed to the pulley 8 and a lower speed to the pulley 9, the particular speed imparted to the pulley 9 being adjustable by shifting the belt 11 between the steps of pulleys 3 and 9 in an obvious manner. Shaft 7 is then rotated at the speed of the pulley 9, the pulley 8 in this position running freely and being out of driving connection therewith, as will presently be explained, the over-running clutch carried by the pulley 9 acting at this time to drive the shaft 7. The arms 58 and 61 engage on the opposite sides of the stop lugs 28 and 29 to retain the discs 21 and 26 and collar 19 stationary with the roller 23 out of clutching engagement with the flange 8', these arms 58 and 61 being held in this position by engagement of the arm 54 with the cam member 48 below the inclined portion 53 thereof. The over-running clutch allows shaft 7 to turn freely within the stationary roller cage.

On depression of the treadle 52, shaft 51 is rocked, thus lowering the inner end of arm 50, and depressing rod 49. This lowers the cam member 48, so that the arm 45 of the bell-crank lever 33 is pushed outwardly by the engagement of the faces 46 and 47, thus lowering the arm 34 and pulling downwardly on the rod 35. This action removes the brake 43 from the wheel 42 and actuates the wedge collar 40 to clutch the shaft 36 to the pulley 37. In this position of the mechanism the shaft 36 is actuated at the lower speed derived through the drive pulleys 3 and 9 of the shaft 1 and the counter-shaft 7 respectively.

On further depression of the treadle 52, cam 48 is further depressed into the position shown in Fig. 1^A. This further motion of the cam block in no wise affects the bell-crank 33, the arm 45 thereof engaging the vertical side of this block, whereby the stop mechanism is retained in its former position with the brake removed and the clutch effecting drive connection between the pulley 37 and the mechanism actuating shaft 36. The cam portion 53, however, rides out of engagement with the arm 54, allowing the same, under the action of the spring 58', to swing the pivot 55, thus turning the arms 58 and 61 out of engagement with their respective stop lugs 28 and 29, and freeing the disc 21 allowing it to rotate with the shaft 7. This action immediately allows springs 23' to bring the rolls 23 into engagement with the interior of the flange 8', which thereupon couples the flange 8' and the idler element or collar 19 and, these through the over-running clutch rollers 18, to collar 16 fixed to the shaft 7, thus coupling the high speed pulley 8 to the shaft 7 for rotation thereof. The shaft 7 is now running at the higher speed, this action being permitted without interference from the pulley 9, by reason of the over-running clutch in the hub 12 thereof. The mechanism actuating shaft 36 is now connected to run at its high speed, being driven through the pulley 37 by means of belt 38 from the pulley 39 rotated at the same speed as the shaft 7.

On allowing the treadle 52 to rise, the cam 48 rises and the face 53 thereof engaging on the arm 54 swings the arm to bring the members 58 and 61 into alignment with the respective stop lugs 28 and 29. The lug 29, as above noted, will not engage the member 58, but the lug 28 will impinge on the end thereof, thus stopping rotation of the disc 21, and consequently the roller cage. The lever 61 due to the spring 63, yields to the passage of both lugs in the normal direction of rotation, but on the stopping of the disc 21 the momentum of collar 19 carries the lug 29 past the end of lever 61 which snaps into position behind the lug preventing springs 23' from reversing the rotation of collar 19 and bringing rollers 23 into clutching relation to flange 8'. The pulley 8 is now free from driving engagement with the shaft 7, which slows down to the speed of the pulley 9 the latter then automatically coming into clutching engagement therewith by means of the over-running clutch in hub 12. The shaft 7 is now driven at the lower speed of pulley 9 and consequently the mechanism shaft 36 is also driven at its lower speed. On further raising of the treadle 52, cam 48 moves upward further allowing the clutch face 46 of the arm 45 to ride beneath the cam face 47. This action allows the spring 44 to raise the clutch wedge 40 to release the clutching engagement of the pulley 37 to the shaft 36, and to apply the brake 43 to the wheel 42, thus stopping the rotation of the shaft 36.

From the above description it will be seen that this invention provides means for driving the mechanism actuating shaft at definite higher and lower speeds, and that a continuous movement by the operator serves to start the machine at the lower speed and then raise the speed to the higher value, while a single actuation from the operator in the other direction causes the machine to resume its lower speed drive and then to stop, it being possible to operate at the lower speed as long as desired, and to either stop from that speed or to drive at the higher speed again at will.

Having thus described one embodiment of this invention, what is claimed is:

1. In a drive mechanism, the combination with a drive shaft, a counter-shaft, and a low speed driving connection between said shafts including an over-running clutch, of a high speed driving connection between said shafts including a sleeve journaled upon said counter-shaft, an over-running clutch-connection between said counter-shaft and sleeve, a power-transmitting element embracing said sleeve and operatively connected with said drive shaft, and a clutch-connection between the sleeve and said power-transmitting element.

2. In a drive mechanism, the combination with a drive shaft, a counter-shaft, and a low speed driving connection between said shafts including an over-running clutch, of a high speed driving connection between said shafts including a sleeve journaled upon said counter-shaft, an over-running clutch-connection between said counter-shaft and sleeve, a power-transmitting element embracing said sleeve, a clutch-connection between the sleeve and said power-transmitting element, and operator-controlled means for normally maintaining said clutch-connection in ineffective position.

3. In a drive mechanism, a power-shaft, pulleys loosely and independently mounted thereon, means for driving said pulleys respectively at relatively high and low speeds, a rotary idler element interposed between said high-speed pulley and said shaft, an overrunning clutch interposed between the low-speed pulley and shaft, means for simultaneously clutching said idler element to said high-speed pulley and said power-shaft, means for unclutching said parts, a mechanism-actuating shaft, and a driving connection between said shafts.

4. In a drive mechanism, a drive shaft, a countershaft, a clutch collar, an over-running clutch interposed between said collar and countershaft, a pulley journaled on said countershaft, a clutch interposed between said collar and said pulley, means to drive said pulley from said drive shaft, means including an over-running clutch to drive said countershaft from said drive shaft at a lower speed than said pulley, and means for controlling the clutch between said collar and said pulley.

5. In a drive mechanism, a drive shaft, a countershaft, a mechanism actuating shaft, drive connections including a stop motion from said countershaft to said mechanism actuating shaft, a low speed drive connection including an over-running clutch from said drive shaft to said countershaft, a pulley journaled on said countershaft, high speed drive connections from said drive shaft to said pulley, a member journaled on said countershaft, an over-running clutch between said member and countershaft, a clutch between said member and said pulley and arranged to be in unclutching condition when said member is held stationary, means for holding said member stationary, and means actuable to first operate said stop motion and then to release said holding means to start said mechanism actuating shaft at low speed and then to increase the speed.

6. In a drive mechanism, a drive shaft, a countershaft, a mechanism actuating shaft, drive connections including a stop motion from said countershaft to said mechanism actuating shaft, a low speed drive connection including an over-running clutch from said drive shaft to said countershaft, a pulley journaled on said countershaft, high speed drive connections from said drive shaft to said pulley, a collar having inclined clutch faces and journaled on said countershaft, an over-running clutch interposed between said countershaft and collar, a member journaled on said countershaft, clutch elements carried by said member and interposed between the clutch faces of said collar and said pulley, means for holding said member stationary, means to retain said elements out of clutching engagement with said pulley, and means for first actuating said stop motion to couple said mechanism shaft to said countershaft and then releasing said member and allowing the clutching of said pulley to said countershaft.

In testimony whereof, I have signed my name to this specification.

HENRY O. FLETCHER.